United States Patent Office 3,234,046
Patented Feb. 8, 1966

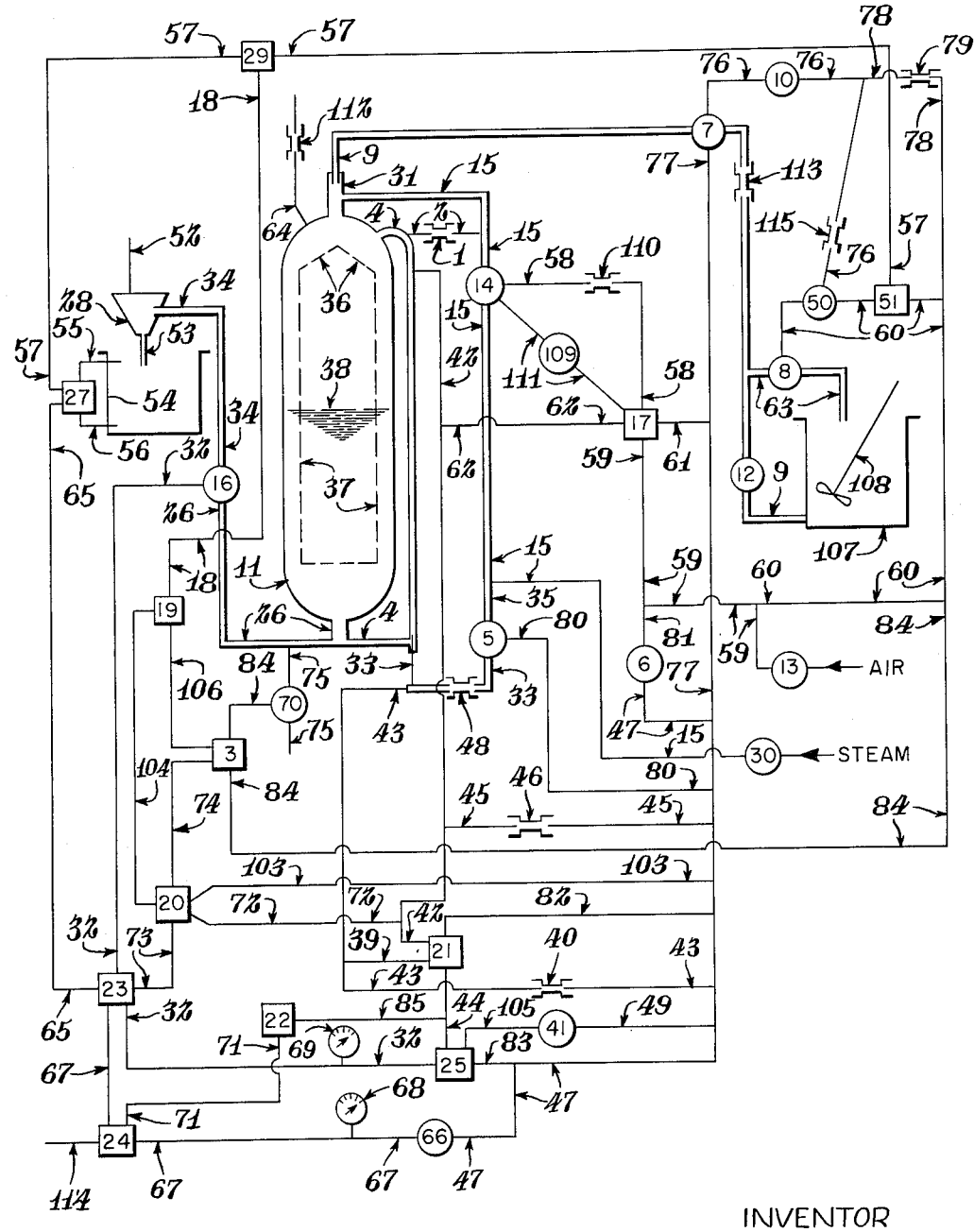

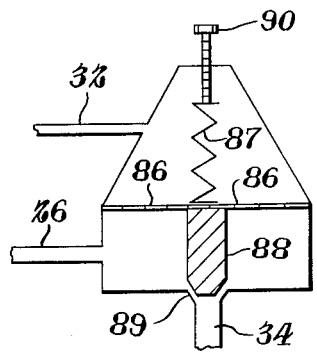
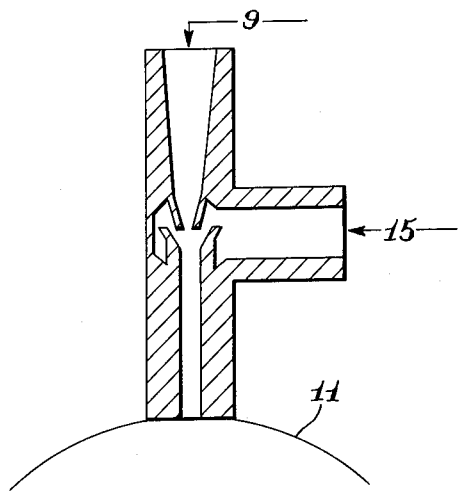
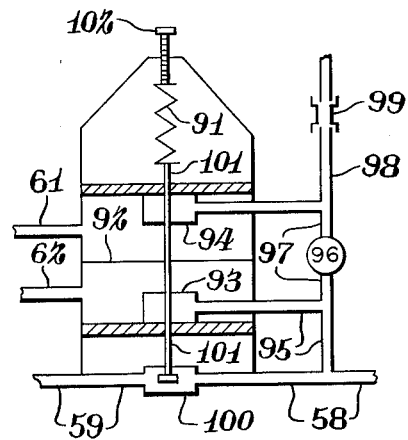
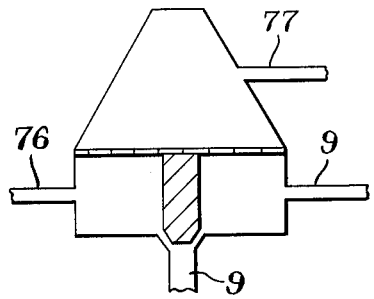
INVENTOR
OLIVER R. ETHERIDGE

3,234,046
APPARATUS FOR CONTINUOUS HEATING
OF LIQUIDS
Oliver R. Etheridge, Decatur, Ill., assignor to A. E. Staley
Manufacturing Company, Decatur, Ill., a corporation of
Delaware
Original application Feb. 2, 1959, Ser. No. 790,487.
Divided and this application Apr. 18, 1962, Ser. No.
190,847
10 Claims. (Cl. 127—28)

This application is a division of application Serial No. 790,487, filed February 2, 1959, now U.S. Patent No. 3,101,284.

This invention relates to improvements in apparatus for the continuous heating of liquid solutions and suspensions with a hot condensable gas or vapor whose condensate is miscible with the heated liquid.

It is frequently desirable to heat liquid solutions and suspensions uniformly at accurately controlled heating time and temperature. Difficulties arise in large scale batch operations, particularly where the heating period is rather short, as, for example, five to ten minutes. The time required to heat the cool charge and to cool it afterward or to discharge it from the heating zone often equals or exceeds the desired heating time at the selected temperature. If the operation is carried out to obtain the average desired heat treatment, some of the material is underheated and some is overheated. An example of such non-uniform heating occurs in the commercial batch production of syrup from starch. A large quantity of acidulated starch-water slurry or paste, measured in the thousands of pounds, is charged into an autoclave, heated under superatmospheric pressure by injected steam for a few minutes, then discharged to atmospheric pressure, neutralized, and refined. With the larger autoclaves, the heat-up and discharge times equal or exceed the hold time at constant temperature. Obviously, the first portion of syrup leaving the autoclave is less converted, i.e., will have a lower dextrose equivalent than the final portion.

It might appear that changing the heating from batch to continuous operation would eliminate the non-uniformity of short heating in large scale batch processes. Closer inspection of the problem and actual experience disprove this anticipation. The reason lies in the flow behavior of the material in the detention or holding zone. If the zone is an extended pipe and the fluid flow velocity is below the critical or turbulent value, as is commonly the case, the typical parabolic distribution of flow rate exists across the pipe. Since detention time is inversely proportional to flow rate, it follows that the material flowing along the axis of the pipe is heated for a much shorter time than that flowing near the pipe wall. If the detention zone is a tank, i.e., a greatly expanded section of pipe, short circuiting of flow and exaggerated variation of detention time usually occur unless elaborate baffles or other means are used to prevent the undesirable flow behavior.

Also, the change from batch to continuous operation frequently introduces new problems related to flow stability and control of variable factors such as temperature and composition of the liquid material being heated. Referring again to the commercial production of starch syrup, it is well known that the continuous method, now in use for several years, has not entirely displaced the batch method despite the shortcomings of the latter. It is reported that one problem remaining with the continuous method is that of obtaining a uniform degree of conversion for all portions of the syrup.

Another commercial process that is gradually being changed from batch to continuous operation is the pasting and cooking of starch. Special problems occur in this area, chiefly because the relatively thin slurry of starch and water thickens greatly at the starch gelatinization temperature.

The present invention is based on the discovery of a new method and associated apparatus for the continuous heating of liquid suspensions and solutions which eliminate the deficiencies of the prior art methods and equipment. In accordance with this invention, all portions of the solution or suspension receive the same heat treatment. Furthermore, the method and apparatus are characterized by good flow stability, ease of control, and adaptability to automatic control. Essentially, the improved method consists of two main steps carried out in the following order: first, the liquid solution or suspension is passed through an enclosed chamber where it is quickly and uniformly mixed with a hot condensable vapor and brought to the approximate desired elevated temperature; second, the heated material is immediately thereafter passed in downward flow through a detention tank designed and operated to provide uniform detention for all portions of the heated material, i.e., designed and operated to provide a piston-like flow of the liquid material through it.

An important feature of the first step is that the mixing of hot condensable gas and liquid solution or suspension in the mixing chamber is very rapid, i.e., practically instantaneous. Thus, the incoming stream of solution or suspension is heated instantly and uniformly. A desirable, but not essential, feature of this step is that the flow rates of the hot gas and liquid material be so adjusted that substantially all of the hot gas condenses in the mixing chamber. This insures a stable and smooth operation of the preferred type of mixing chamber, one based on the jet or aspirator principle.

The second process step, passage of the heated liquid material through a detention tank and associated apparatus, is characterized by the following primary features:

(1) A detention tank—instead of a pipe line—providing for downward slow flow of the heated material.

(2) A liberal head or free gas space above the accumulated material in the detention tank during normal operation and liquid distributing means disposed therein.

(3) Controlled variation of liquid detention time by controlled variation of liquid depth in the tank at constant throughput of material.

The second step may be improved by the following secondary features:

(4) Use of a liquid discharge valve operatively associated with means for sensing the level of liquid accumulated in the detention tank to provide for continuous throughput of processed material at selected constant depth of accumulated liquid in the detention tank.

(5) Incorporation of air, or other inert non-condensable gas with the liquid material fed to the apparatus so that the heated material entering the detention tank contains numerous fine bubbles of the gas which briefly lower the material's density and which gradually rise in the accumulated material.

(6) Constant purge of condensable and non-condensable gases from the detention tank gas space through a fixed leak.

(7) Reheating of material as it flows over the liquid distributing means in the detention tank, if necessary or desired, by delivering hot gas to the tank head space by a conduit which by-passes the mixing chamber.

(8) Use of a pressure relief valve in the conduit supplying liquid to the mixing chamber, the relief valve being positioned between the mixing chamber and means for forcing the liquid into the chamber against the detention tank pressure, and the relief pressure of said valve being set at a value substantially above the detention tank pressure.

(9) Use of pressure feed-back in a combination hydraulic-pneumatic circuit involving the relief valve in the liquid supply conduit, a relief valve in a liquid by-pass conduit, a flow restriction in the liquid conduit connecting the two relief valves, and a combination spring and air-loaded air pressure regulator.

Feature 8 prevents minor fluctuations of pressure occurring in the mixing chamber from interfering with the flow of liquid into the chamber, and feature 9 prevents interference with that flow by minor variations in the operation of the two relief valves and the means for forcing the liquid into the mixing chamber.

In more detail, the foregoing primary and secondary features of this invention are as follows:

(1) The detention tank is an enclosed elongated chamber preferably, but not necessarily, cylindrical in shape, whose longitudinal axis is substantially vertical, and whose length does not exceed five cross-sectional perimeters.

(2) The detention tank is operated with a liberal head or gas space at the top of the tank above the surface of the accumulated liquid. Purposes of the gas space are (a) to allow for the escape of air or other non-condensable gases from the incoming liquid, (b) to provide room for means for distributing the incoming liquid uniformly over the surface of the quiescent liquid accumulated in the detention tank, (c) to provide a gaseous, low-inertia back pressure medium for the discharge side of the mixing chamber, and (d) to permit the liquid distributing means to promote thermal equilibrium between the liquid and hot gas in the tank, part of which hot gas may have passed uncondensed through the mixing chamber, and part of which may enter the tank by a conduit which by-passes the mixing chamber. The combination of downward flow and liberal gas space, in contrast with upward or horizontal flow in a liquid-full detention chamber minimizes short-circuiting of flow and non-uniformity of detention time.

(3) Detention or heating time is easily and controllably varied by varying the depth of accumulated liquid in the detention tank. This requires a constant flow rate of material through the apparatus which, by itself, is an advantageous feature.

(4) Selected depth of accumulated liquid in the detention tank is automatically maintained during normal operation of the apparatus by cooperative combination of (a) means for sensing the depth of liquid accumulated in the detention tank, (b) a heavily spring loaded pressure relief valve controlling the discharge of liquid from the bottom of the detention tank, and (c) means for delivering a signal from the depth sensing means to the discharge valve, the value of which signal is dependent solely upon the liquid depth and which signal controls the action of the discharge valve. By the foregoing means the discharge valve smoothly and stably regulates the discharge of liquid to maintain the depth of accumulated liquid within acceptably narrow limits.

(5) As will be explained later, incorporation of air as entrained bubbles with the liquid material fed to the apparatus occurs when a preferred method for controlling the liquid material flow is used. In this invention, the presence of entrained air is an advantage rather than a disadvantage. The entrained bubbles are greatly reduced in size by the turbulent flow of material through the mixing chamber and are uniformly dispersed in the hot liquid as it flows onto the liquid distributing means in the detention tank gas space. The bubbles remain dispersed long enough to reduce the gross density of the liquid as it joins the surface of the earlier heated liquid accumulated in the detention tank. The latter is denser because the air bubbles have had time to rise in whole or in part. The net result is a floating of later entering liquid on top of that entering earlier and consequently a reduction in any tendency of the entering material to mix with that already accumulted in the tank.

(6) Frequent escape of hot condensable gas and air, or other non-condensable gas from the detention tank gas space is necessary, otherwise the non-condensable gas progressively dilutes the condensable gas and alters the relationship between detention tank pressure and temperature. Since the tank temperature is conveniently controlled by controlling its condensable gas pressure, excessive dilution of the condensable gas with non-condensable gases is prevented by means of a fixed orifice or leak in the top of the tank.

(7) Temperature of the liquid material tends to drop appreciably while it resides in the detention tank. There are three chief sources of temperature drop, as follows: (a) loss of heat through the tank wall or shell by radiation and conduction, (b) loss of heat in the gases vented to purge the gas space of accumulated non-condensable gases, (c) absorption of heat due to delayed physical and chemical modification of the dissolved or suspended material during the detention period. To maintain the same temperature in the detention tank as that of the hot gas fed to the mixing chamber, it becomes necessary, therefore, to supply more heat to the tank than reaches it in the form of heating gas condensed in the mixing chamber. The necessary additional heat can be supplied through the mixing chamber as uncondensed heating gas by increasing the gas pressure to the mixing chamber. This is a satisfactory solution of the problem except for the fact that it produces an objectionable hammering or chattering of the jet or aspirator type of mixing chambers. The preferred method of supplying the additional hot gas, one that does not interfere with the quiet and stable operation of the preferred type of mixing chamber, is to feed the additional heating gas to the detention tank through a pipe which by-passes the mixing chamber.

(8) The preferred type of mixing chamber is one based on the jet or aspirator principle. Mixing of liquid and hot condensable vapor by such means is normally accompanied by minor fluctuations in pressure. To prevent such fluctuations from influencing the flow rate of liquid into the mixing chamber, a pressure relief valve is installed in the liquid supply conduit. By setting the relief pressure of the valve at a pressure substantially above the condensable gas vapor pressure desired in the detention tank, the means for controlling the liquid flow rate are effectively isolated from the normal pressure fluctuations in the mixing chamber.

(9) As mentioned earlier, the apparatus is preferably operated at constant throughput of material. The residence time in the detention tank is then dependent solely upon the depth or volume of liquid detained in the tank. Constancy of liquid flow to the mixing chamber is preferably obtained by a combination of these elements: (a) the pressure relief valve in the liquid supply conduit mentioned in item 8 above, (b) a pressure relief valve in a liquid by-pass conduit, (c) means for applying a pressure head to the liquid in the supply conduit, (d) a flow restriction in the liquid conduit connecting the two relief valves, (e) an air pressure regulator whose diaphragm is loaded partly with a spring and partly with applied air pressure, and whose variable output air pressure establishes the relief pressure of the by-pass valve, and (f) means for reflecting or feeding back the liquid pressure at the inlet side of the relief valve in the liquid supply conduit in the form of air pressure to the bonnet of the air pressure regulator.

An advantageous apparatus feature of this invention is the provision of a low-flow resistance conduit from the outlet of the mixing chamber to the top of the detention tank. This is easily accomplished by positioning the mixing chamber above the tank top and connecting the two with a short section of sufficiently large diameter pipe. This feature improves the operation of the apparatus when viscous solutions or suspensions are processed.

Another advantageous apparatus feature of this invention is a novel combination of standard reducing and relief valves with an interlocking system of pilot air control to provide an unusually convenient system for varying the processing conditions and operating the apparatus automatically at selected values thereof.

The method and apparatus of this invention are adaptable to the heating of a wide variety of liquid solutions and suspensions. Method examples are: (1) conversion of starch to syrup, (2) starch cooking, i.e., preparation of starch pastes at conventional temperatures, (3) thermal modification of starch pastes at elevated temperatures, e.g., in the range of 250–350° F., (4) cooking of starch-base jelly products such as those used in the manufacture of gum drops, (5) preparation of vegetable gum hydrosols, and (6) chemical reactions in liquid systems requiring heating for satisfactory reaction rate.

Although the advantages of this invention are most pronounced where the required heating period is rather short, i.e., does not exceed about 15 minutes, the invention is applicable also to longer heating periods. The longer heating periods can be provided by increasing the volume of the detention chamber or decreasing the rate of liquid throughput or both. No process inconvenience occurs as the detention chambers are made larger. At shutdown, for example, detention time is held constant simply by stopping the flow of material into the top of the detention chamber and withdrawing the material from the bottom at the same rate as it entered the top.

A broad object of the present invention is the provision of improved method and apparatus for the accurately controlled and uniform continuous heating of liquid solutions and suspensions.

In more detail, the foregoing broad object of this invention is the provision of improved apparatus for the accurately controlled and uniform continuous heating of liquid solutions and suspensions characterized by the following features: (1) instantaneous and uniform heating of a stream of liquid solution or suspension by mixing it with a stream of hot condensable gas in an enclosed mixing chamber positioned at the top of an enclosed detention tank, (2) slow passage of the heated material, including condensed heating gas downwardly through a detention tank which provides for a liberal head or gas space in its upper part above accumulated liquid material in its lower part and which has a liquid distributing means in its gas space, and (3) controlling the detention time of the heated liquid in the detention tank by controlling the depth (i.e., the volume) of the liquid retained in the tank at constant throughput of material.

Another object of the present invention is the provision of improved apparatus for the continuous cooking or pasting of starch at conventional pasting temperatures.

An additional object of the invention is the provision of improved apparatus for the continuous thermal modification of starch pastes at temperatures markedly above conventional starch cooking or pasting temperatures, e.g., at temperatures in the range of 250–350° F.

A further object of the invention is the provision of improved apparatus for the continuous cooking of starch-base jellies such as, for example, those used in the manufacture of gum drops.

Still another object of the invention is the provision of improved apparatus for the continuous conversion of starch to syrup.

Additional objects of the invention will appear in the following detailed description of one embodiment of the invention including attached drawings.

For a more complete understanding of the nature of the invention, there is now presented a detailed description of one embodiment thereof, namely apparatus for the continuous thermal modification of aqueous starch pastes at elevated temperatures using steam as the condensable heating gas.

FIG. 1 is a diagrammatic view of the preferred apparatus and control mechanisms for the foregoing embodiment of the invention. FIG. 2 is a diagrammatic view illustrating in more detail the paste discharge valve 16 in FIG. 1. FIG. 3 details diagrammatically some of the features of the preferred mixing chamber 31 in FIG. 1. FIG. 4 is a diagrammatic view illustrating in more detail the pressure controller 17 in FIG. 1. FIG. 5 is a diagrammatic view of starch slurry relief valve 7 in FIG. 1.

Returning to FIG. 1, reference numeral 107 designates a starch slurry tank equipped with agitator 108 and bottom outlet pipe 9. Starch and water are added in selected proportions as required to tank 107, where they are mixed and kept in uniform suspension by the agitator. Tank 107 also serves as a starch slurry reservoir.

Starch slurry from tank 107 is delivered to mixing chamber 31 of the apparatus through slurry tank outlet pipe 9 including pump 12, restriction 113, and relief valve 7. The mixing chamber, illustrated diagrammatically in more detail in FIG. 3, is close connected to the top of detention tank 11 and opens directly thereinto. In this particular embodiment of the invention, the detention tank is an insulated steel cylindrical tank approximately sixty inches long and eighteen inches in diameter.

Steam is delivered to mixing chamber 31 through gate valve 30 and pipe 15 containing pressure regulating valve 14. Owing partly to structural design of the mixing chamber (see FIG. 3) and partly to the control of steam and slurry flow rates, the entering starch slurry and steam are quickly, almost instantaneously, mixed thoroughly. Pressure and rate of steam flow are preferably controlled during normal operation of the apparatus so that substantially all of the steam condenses in the mixing chamber.

Detention time for the material passing through the mixing chamber 31 during normal operation of the apparatus is only a fraction of a second. In this short time the heated starch slurry does not develop its maximum viscosity or absorb all of the heat of gelatinization. Consequently, the apparatus will process high solids starch slurries without interference due to restricted flow of viscous material through the mixing chamber.

Additional steam is admitted to the detention tank by two routes: (1) to the top of the tank through pipe 2 containing orifice 1 and through the upper part of pipe 4, thus by-passing the mixing chamber, and (2) to the bottom of side arm pipe 4 through pipe 33 containing small fixed orifice 48. Most of the additional steam enters through pipe 2 and the purpose of this extra steam is to compensate for temperature drops that would otherwise occur in the detention tank. These temperature drops are due chiefly to loss of heat through the tank wall, to delayed absorption of heat of the gelatinization of the starch to absorption of heat due to physical and chemical modification of the starch, and to heat lost in the steam purge. Purpose of the relatively small proportion of steam entering through pipe 33, together with a small flow of air from air line 43, is to prevent plugging of pipe 33 with dried starch paste.

Pipe 4 is, as shown in FIG. 1, parallel to the longitudinal axis of the detention tank and connected to the top and bottom of the tank. Purpose of pipe 4 is to provide means for sensing the pressures at the top and bottom of the tank without disturbing the main flow of material through the tank. A convenient means of sensing the pressures is to attach air lines at the proper positions and then slowly bleed air through the lines into the tank. The air bleed prevents fouling of the pressure sensing element with material in the tank. Since an air bleed directly into the bottom of the tank would tend to promote an undesirable circulation of liquid material therein, side arm pipe 4 is used to minimize that circulation. In this particular embodiment, pipe 4 has an inside diameter of about one and one-half inches.

The heated and partially gelatinized starch slurry flows rapidly out of mixing chamber 31 into the top of detention tank 11 and falls onto conical baffle 36. It flows down the sloping surface of the baffle to the circular edge thereof, where it meets the top of cylindrical screen 37 attached to the conical baffle as shown. The hot starch slurry, by now well on its way to complete gelatinization, continues its downward course on the cylindrical screen 37 and eventually joins the collected body of starch paste at surface 38.

Because of the elevated temperature maintained within the detention tank, the entering starch slurry quickly gelatinizes and reaches a temporary maximum viscosity. Then it thins out rapidly because of exposure to the tank temperature. The extent of thinning and other changes in the starch paste properties can be controlled to a marked degree by the temperature and duration of holding in the tank.

As the hot, thermally-modified starch paste flows out the bottom of the detention tank 11 through pipe 26 and through flow regulating or "blow-down" valve 16, additional material flows in at the top of the tank to maintain the surface 38 of accumulated paste at a constant height above the tank bottom. This is accomplished with the differential pressure cell or transmitter 21 of known type which senses the hydrostatic pressure of accumulated liquid in the tank through two air lines, one labeled 42 leading to the free gas space in the top of the tank through the upper part of pipe 4, and the other labeled 43, leading to the bottom of side arm pipe 4 through steam line 33 as shown. The sensed pressure difference between lines 43 and 42, multiplied by a suitable factor, is delivered through air line 44 to a reverse acting pressure controller 25 of known type. The output pressure of controller 25, equal to the input pressure from the differential pressure cell 21 multiplied by a suitable inverse factor, is delivered to flow regulating valve 16 through air line 32 and solenoid valve 23 as shown. As noted above, pressure controller 25 must be reverse acting, that is, the output pressure from the differential pressure cell 21 must be inverted, and then amplified because a rise in level 38 calls for opening valve 16, which in turn requires a drop in air pressure applied to the bonnet of valve 16.

Air lines 43 and 42 carry very slow flows of air into the bottom and top, respectively of the side arm pipe 4. This is obtained, as shown in FIG. 1, with bleed lines 43 and 45 and their respective fixed orifices, 40 and 46. Both bleed lines take air from air manifold 47 carrying 65 p.s.i. air pressure. The flow rates in lines 43 and 42 are so small that pressure drops therein are negligible. Consequently, the pressures sensed in these two air lines with the differential pressure cell 21 are truly indicative of the bottom and top tank pressures.

Flow regulating valve 16, illustrated diagrammatically in more detail in FIG. 2, is spring and air loaded on the same side of diaphragm 86. The other side of the diaphragm is in contact with the hot starch paste from pipe 26 under detention tank pressure. The tank pressure tends to open the valve by lifting the diaphragm and attached member 88 from valve seat 89; the spring 87 and air pressure applied through air line 32 tend to close the valve. Spring 87 has a high spring constant and is strong enough to oppose a large share of the total force exerted on the diaphragm by the hot paste. The valve is opened by reducing the applied air pressure, and closed by increasing the air pressure. At the valve opening which permits the normal operating paste flow of about 4 g.p.m., the applied air pressure is about 20 p.s.i. The valve is firmly closed by increasing the air pressure to about 60 p.s.i. In this position, the spring is relaxed or under very slight compression. Adjustments in spring pressure can be made with screw 90.

The necessary variation in output air pressure from pressure controller 25 is derived from relatively small changes in tank 11 hydrostatic pressure (i.e., changes in level of paste surface 38) as follows: A change in the pressure difference between air lines 43 and 42, essentially a change in level 38, is amplified ten fold in the output pressure of differential pressure cell 21. In turn, this output pressure variation, fed to controller 25 through line 44, is inverted and amplified thirty fold as the output pressure of the controller. Thus a change in paste hydrostatic pressure is inverted and amplified 300 fold in the output air pressure of the pressure controller 25. To obtain a 40 p.s.i. variation in the output pressure, the paste hydrostatic pressure needs to change only by 40/300 or 0.133 p.s.i. This is equivalent to a change in the level of surface 38 of about 3.5 inches. The level fluctuates much less than this during normal operation of the apparatus. The operating characteristics of valve 16, particularly spring 87, are such that the valve floats steadily at some open position instead of hunting between shut and wide-open positions.

The paste depth in tank 11, and hence the paste detention time, can be varied at will by manually changing the setting of air pressure regulating valve 41 of known type. This regulator, which is spring loaded only, is serviced with 65 p.s.i. air pressure through air lines 49 and 47 connected to a suitable air supply as described hereafter. The regulator ouput pressure delivered to presure controller 25 through air line 105 can be varied from 0 p.s.i. upwards by increasing the spring loading. The output pressures from regulator 41 and differential pressure cell 21 are approximately balanced in pressure controller 25. Since the output pressure of the differential pressure cell is the tank hydrostatic pressure amplified by a factor of ten, the necessary range of output pressure from regulator 41 to accommodate a tank level range of five feet is about 23 p.s.i.

The hot paste, after escaping through valve 16, starts to boil or flash as it flows through pipe 34 to flash chamber 28. Here its pressure drops to atmospheric and its temperature to that in equilibrium with saturated steam at the atmospheric pressure. The separated steam escapes from the flash chamber through vent 52, and the hot paste flows through pipe 53 by gravity or other known means to paste storage tank 54.

The paste storage tank is equipped with an upper probe 55 and a lower probe 56. The paste level in the storage tank is maintained between the two probes as follows. Immersion of the upper probe 55 in the rising paste activates electrical relay 27. In turn, the relay operates through electrical line 57 and manually closed switch 29 to close solenoid valve 51 and shut off the pressure in air line 60 leading to pressure regulator 50 and from there to the bonnet of relief valve 8. The output pressure of regulator 50 determines, and is the same as, the relief pressure of valve 8 in the starch slurry return line 63. Cutting off the output pressure from regulator 50 to relief valve 8 through air line 60, by closing solenoid valve 51, stops the flow of starch slurry through pipe 9 and relief valve 7 into the mixing chamber 31. The flow stops because the relief pressure of valve 8 is now essentially 0 p.s.i., far below the 65 p.s.i. relief pressure of relief valve 7, thus opening by-pass line 63 and permitting the recirculation of the entire pump output at very low pressure.

Immersion of the upper probe 55 in paste storage tank 54 also activates electrical relay 27 to operate, through electric line 65, and move three-way solenoid air valve 23 to disconnect the bonnet of flow regulating valve 16 from pressure controller 25 (via air line 32) and connect it to pressure regulating valve 66 through air line 67 containing solenoid valve 24. Pressure regulator 66 is serviced with 65 p.s.i. air pressure from air manifold 47. The reduced air pressure from valve 66 is set to equal the output pressure from pressure controller 25 under equilibrium flow conditions. When upper probe 55 becomes immersed in starch paste, thus stopping the flow of starch slurry into the detention tank, flow regulator valve 16 is removed from automatic response to liquid depth in the detention tank and held at its former equilibrium position. This insures the correct detention time for the remaining paste by draining the tank at the same rate it was filled. Pressure gages 68 and 69 attached to air lines 67 and 32, respectively, make it convenient to set pressure regulating valve 66 at the required pressure.

When the paste level closely approaches the bottom of the detention tank, during the above described draining operation, pressure sensitive switch 22 is activated through air line 85 to move solenoid air valve 24 in air line 67 by means of electrical line 71. The valve is moved to disconnect the bonnet of valve 16 from pressure regulating valve 66 and vent the bonnet to the atmosphere by way of air line 114. This venting of the bonnet opens valve 16 wide, causing the residual paste to be blown out through pipes 26 and 34 and producing a momentary drop in the detention tank steam pressure. The momentary drop in tank pressure is transmitted through air lines 42 and 72 to pressure switch 20 which is thus activated to move solenoid valve 23, via electrical line 73, and again connect the bonnet of valve 16 to pressure controller 25 through air line 32. Since the output air pressure from controller 25 is highly responsive inversely to the hydrostatic pressure in the detention tank, the low paste level therein produces high output pressure from controller 25 and this closes valve 16 tightly. At the same time, activated pressure switch 20 operates through electrical line 74 to close normally open solenoid air valve 3. This closing of solenoid valve 3 disconnects the bonnet of valve 70 from its supply of high pressure air delivered through line 84 and vents the bonnet of valve 70 to the atmosphere. The detention tank steam pressure then opens valve 70 and connects the tank through line 75 to a steam trap not shown in the drawing. The apparatus is now in a hot stand-by condition ready to resume operation as soon as the paste level in storage tank 54 drops to expose the lower probe 56.

Solenoid air valve 51 remains closed until the paste level in storage tank 54 drops and exposes lower probe 56. Exposure of the lower probe operates through electrical relay 27, electric line 57 and manually closed switch 29 to open solenoid valve 51. Opening valve 51 starts the slurry flowing again into mixing chamber 31 as follows. First, attention is called to air line 76, containing fixed orifice 115 and check valve 10, leading from the bonnet of pressure regulating valve 50 to the liquid inlet side of relief valve 7. During normal operation of the apparatus at a detention tank steam pressure of about 55 p.s.i., the maximum input pressure of valve 7 is set at 65 p.s.i. by the 65 p.s.i. pilot air pressure in air line 77 fixed by regulating valve 6. The pilot air pressure on relief valve 8, delivered through line 60 from pressure regulating valve 50, is 85 p.s.i. Regulating valve 50 is spring loaded to 20 p.s.i. In order for valve 50 to deliver 85 p.s.i. output pressure to valve 8, it is necessary for 65 p.s.i. of air pressure to supplement the spring loading of 20 p.s.i. This is accomplished by bleeding air from line 78 to line 76 through small fixed orifice 79. With relief valve 8 set for 85 p.s.i. and relief valve 7 set for 65 p.s.i., the air bleed into line 76, and thus into the bonnet of regulating valve 50 builds up to 65 p.s.i. and then slowly escapes through the liquid inlet side of valve 7. Check valve 10 in line 76 prevents any counter flow of air or starch slurry in the line due to surging that might occur in pipe 9.

Obviously, the necessary 65 p.s.i. does not build up immediately in air line 76 when solenoid valve 51 is opened after a shut-down. With solenoid valve 51 closed, there is no output air pressure from valve 50 and consequently relief valve 8 is set for 0 p.s.i. relief pressure. The pressure in pipes 9 and 63 is then only the slurry flow resistance which is less than 1 p.s.i. Also, the air pressure in line 76 drops to less than 1 p.s.i. because the bleed air escapes through the inlet side of relief valve 7 into pipe 9. The bleed air thus sweeps the starch slurry out of pipe 9 between valves 7 and 8 into the recirculation stream in pipe 63 and thus prevents troublesome settling of starch in valve 7. Opening the solenoid air valve 51 immediately delivers 20 p.s.i. output air pressure from regulator 50 to valve 8 through air line 60. This is due to the constant spring loading of 20 p.s.i. on regulator valve 50. The 20 p.s.i. pilot air pressure on relief valve 8 restricts slurry flow through the valve until the pressure on the inlet side (pipe 63) builds up to 20 p.s.i. As the pressure builds up in pipes 9 and the valve 8 inlet part of pipe 63, owing to constant running pump 12, the pressure is reflected or fed back to air line 76. The constant slow bleed of air from high pressure air line 78 into line 76 through orifice 79 imposes the reflected pressure on the bonnet of pressure regulator 50. This, in turn, increases the output pressure of the regulator which increases the relief pressure of valve 8 which increases the feed-back pressure in line 76. The result is that the output pressure of regulator 50 smoothly builds up to 65 p.s.i. At this point, starch slurry begins to pass through relief valve 7. Air pressure in line 76, which has been lagging 20 p.s.i. behind the pressure in pipes 9 and 63, soon equals the 65 p.s.i. slurry pressure in pipe 9. This increases the output pressure of valve 50, i.e., the relief pressure of valve 8, to 85 p.s.i. and increases the rate of slurry flow through pipe 9 and relief valve 7. Owing to the flow characteristics of relief valve 7, the increased flow does not appreciably increase the pressure on the inlet side of the valve. The result is that the slurry flow system smoothly comes to equilibrium at 85 p.s.i. pressure on the inlet side of relief valve 8, with 65 p.s.i. pressure on the inlet side of relief valve 7, and a pressure drop of 20 p.s.i. through constriction 113 in pipe 9 accompanied by a slurry flow rate of 4 gal./min. The excess capacity of positive displacement pump 12 recirculates through relief valve 8 and slurry tank 107.

Use of the foregoing feed-back arrangement in controlling the starch slurry flow prevents interference of flow rate by minor fluctuations in the operations of relief valves 7 and 8 and pump 12.

As the starch slurry flows into the detention tank, following a draining and hot stand-by cycle as described above, the hot paste accumulates in the tank until its height above tank bottom reaches the value pre-selected by the setting of air pressure regulator 41. At this point, the hydrostatic pressure of the paste, operating through differential pressure cell 21 and air pressure controller 25 as previously described, reduces the output air pressure of the controller to the bonnet of flow regulating valve 16, thus allowing the paste pressure to open valve 16 as required to maintain the selected liquid height in the detention tank.

The temperature and steam pressure in detention tank 11 are determined by steam pressure regulating valve 14 of known type. Functioning of this valve is controlled by air pressure delivered to the valve bonnet through air line 58 and orifice 110 from pressure controller 17 of known type illustrated diagrammatically in more detail in FIG. 4. Valve 14 and controller 17 are also connected by parallel air line 111 containing check valve 109. This arrangement permits decreasing the bonnet pressure of valve 14 rapidly, but increasing it only at restricted rate, thus stabilizing the control action. The valve opens and closes to maintain, or try to maintain, in pipe 15 a steam pressure of the same value as the air pressure in the bonnet. Controller 17 is serviced with 65 p.s.i. reference air pressure through air line 61, with 100 p.s.i. operating air pressure through air line 59, all or a part of which pressure may be delivered to the bonnet of valve 14 through air line 58, and with feed-back pressure from the gas space of tank 11 through air lines 62 and 42. As shown in FIG. 4, the controller is also equipped with a manually-adjustable variable-tension spring 91, whose tension combines with the tank feed-back pressure to oppose the 65 p.s.i. reference pressure delivered through line 61 in moving the main diaphragm 92 of the controller. As additionally shown in FIG. 4, the full output pressure of the controller is fed back through air line 95 to a separate diaphragm 93 on the tank pressure side of the main diaphragm, and the output pressure diminished by a manually-adjustable proportion is fed back through air line 97 to another separate diaphragm 94 on the other side of the main diaphragm. The reduced output pressure feed-back is obtained by means of the manually-adjustable needle valve 96 in line 97 and fixed bleed orifice 99 in air line 98 as shown in FIG. 4.

The position of the movable diaphragm in controller 17 determines the controller output pressure in line 58. Diaphragm position is transmitted by rod 101 to element 100 of known type which modulates and reduces the 100 p.s.i. service air pressure applied through air line 59. The diaphragm position is sensitive to the tank feedback pressure, and the degree of sensitivity is determined by the ratio $P_1/P_1 - P_2$ where $P_1$ is the full output pressure and $P_2$ is the reduced output pressure as mentioned above. Thus, if $P_2$ is 95% of $P_1$, the sensitivity is 20 fold. That is, a drop of 0.05 p.s.i. in the tank pressure produces a compensating rise of 1 p.s.i. in the output pressure of the controller and a corresponding opening of steam valve 14.

Small changes in tank pressure and temperature can be made by adjusting the spring 91 by means of thumb screw 102 in pressure control valve 17 without changing the reference air pressure or disturbing the relief pressure of valve 7.

Purge pipe 64 leading from the gas space of detention tank 11 and containing fixed small orifice 112 permits a constant flow escape of steam and other gas during operation of the apparatus. The constant leak prevents accumulation of air in the tank. If the air were allowed to accumulate in the gas space, it would soon dilute the steam and lower the tank operating temperature for a given setting of steam pressure regulating valve 14.

Attention is called to the control of starch slurry flow into the apparatus. The flow is controlled by the paste level in storage tank 54. It is independent of temperature, pressure, and paste level in the detention tank. The flow is "on" or "off," and normally at a constant rate of 4 g.p.m. when "on." The only exception to this constancy of flow rate is a brief transient period at the beginning of flow after the flow has been stopped.

The starch slurry is pumped into the detention tank through a relief valve whose relief pressure is set about 10 p.s.i. above the tank steam pressure. Steam flow into the tank is controlled by a pressure regulating valve sensitive to the tank pressure. Under these conditions, the steam entering the mixing chamber 31 mixes quietly and uniformly with the starch slurry and most of the steam condenses in the slurry.

The following additional description of the apparatus and its use in the high temperature modification of starch paste will be helpful in understanding the invention. This description presents the sequence of actions which occurs when the cold and empty apparatus is started up. The description includes tracing of air, steam, and starch slurry flows with explanation of regulating and controlling valve operations.

First, steam at a pressure of about 100 p.s.i. is admitted to steam line 15 by opening gate valve 30. Initially, no steam passes pressure reducing valves 14 and 5 because no pilot air pressures have yet been delivered to their bonnets through air lines 58 and 80, respectively.

Next, air from the high pressure air line labeled AIR in FIG. 1 is supplied to pressure reducing valve 13 by opening a gate valve in the AIR line, not shown in the drawing. Optionally, the main air valve may be opened automatically when the steam pressure builds up to desired pressure (e.g., 95 p.s.i.) in steam line 15. This can be done by connecting steam line 15 to a pressure switch set for 95 p.s.i. which in turn would cause a suitable solenoid to open the main air valve, admitting air to air line 59 through reducing valve 13. The optional pressure switch and associated solenoid valve are not shown in FIG. 1.

Valve 13 is spring loaded to 100 p.s.i. and delivers that much pressure to air lines 59, 60, 78, and 81. The latter lines supply this pressure to fixed orifice 79, to solenoid valve 51 (and from there to pressure reducing valve 50), to pressure controller 17, to pressure reducing valve 6 and through solenoid valve 3 to valve 70.

Pressure reducing valve 6, spring loaded to yield 65 p.s.i. supplies this lower pressure to the following locations: to pressure controller 17 through lines 47, 77, and 61 as a reference pressure; to the bonnet of relief valve 7 through lines 47 and 77 as a pilot pressure; to fixed orifice 46 in line 45 through line 47; to the bonnet of steam pressure reducing valve 5 through lines 47 and 80 as a pilot pressure; to differential pressure cell 21 through lines 47 and 82 as a reference pressure; to fixed orifice 40 in line 43 through line 47; to spring loaded pressure reducing valve 41 through lines 47 and 49 as supply air; to inverse pressure controller 25 through lines 47 and 83 as supply air; and to spring loaded pressure reducing valve 66 through line 47 as supply air.

Pressure controller 17 is essentially a pressure reducing valve whose output pressure is supplied to the bonnet of steam pressure regulating valve 14 through line 58. As explained earlier, the output pressure of controller 17 is highly responsive to small changes in detention tank pressure fed back to the controller through air lines 42 and 62. If, for example, the tank pressure drops by 0.05 p.s.i., the controller increases its output pressure twenty-fold, i.e., 1 p.s.i., and thus causes valve 14 to feed higher pressure steam to the tank. This means for controlling the detention tank pressure (and temperature) is much superior to the use of a simple spring loaded pressure regulating valve at position 14.

Valve 14 admits steam into pipe 15, and from there into mixing chamber 31 and detention tank 11, until the detention tank steam pressure equals the air pressure applied to the bonnet of valve 14, i.e., the output air pressure from controller 17. It can range from a low of the pilot air pressure of 65 p.s.i. (applied through air line 61) diminished by the tension of spring 91 to a high of the 100 p.s.i. of the supply air pressure in line 59. As explained earlier, the output pressure of controller 17 is highly responsive to the detention tank pressure fed back to the controller through air lines 42 and 62. If the feed-back pressure is less than the pilot pressure diminished by spring 91 (in this particular instance 65 minus 9 or 56 p.s.i.), the output pressure increases by twenty times the difference. If, on the other hand, the feed-back pressure exceeds the desired tank operating pressure, the output pressure decreases by twenty times that difference.

Steam pressure now builds up in the detention tank to about 55 p.s.i., or the 56 p.s.i. "set" pressure of valve 14 less about 1 p.s.i. pressure drop through pipe 15 and mixing chamber 31. The tank pressure builds up because discharge valve 16 in the tank bottom outlet pipe 26 is closed against this much pressure. As explained earlier, the operation of discharge valve 16 is controlled by the output pressure of inverse pressure controller 25, which in turn is controlled by the output pressure of differential cell 21 which is highly responsive to the paste level in detention tank 11. The opening pressure of valve 16 is highest when its bonnet pressure is highest. This occurs when solenoid valve 23 is open to air line 32 and the output pressure of controller 25 is maximum, i.e., when the paste level in detention tank 11 is lowest. Solenoid valve 23 normally connects pressure controller 25 to discharge valve 16 through air line 32. Only when valve 23 is energized through electric line 65, due to immersion of upper probe 55 of paste storage tank 54, does it move to disconnect valve 16 from pressure controller 25 and then to connect valve 16 which pressure regulator valve 66 through air line 67 containing solenoid valve 24.

Valve 70 in drain line 75 leading to a steam trap, not shown in the drawing, is also open at this time. Consequently, the apparatus is now in a hot stand-by condition ready to receive and process starch slurry. Valve 70 is closed during normal operation of the apparatus. It is open only when the high pressure air delivered to its bonnet through air line 84 containing solenoid valve 3 is cut off and vented by the closing of solenoid valve 3. The latter, which normally remains open by spring action, is closed either when energized via electric line 74 from pressure switch 20 or via electric line 106 from relay 19. Pressure switch 20 senses the difference between a reference pressure and the detention tank pressure through air lines 103 and 72, respectively, by known means. Whenever the difference exceeds a set value, in this case such that the tank pressure is 51 p.s.i. or less, a flexible diaphragm is moved to make electrical contacts and thus energize solenoid valve 3 via electric line 74. The same movement of the flexible diaphragm in pressure switch 20 also makes electrical contacts to send an energizing current through electric line 104 to the coil of electrical relay 19. The latter then makes other electrical contacts to send a second energizing current to solenoid valve 3 through electric line 106. Relay 19 is a "lock-in" relay. Its contacts closing the second energizing current to solenoid valve 3 are not released when the diaphragm in pressure switch 20 moves in opposite direction (i.e., when the tank pressure exceeds 51 p.s.i.). Those contacts are released only when a second electrical circuit energizing the coil in relay 19 through electric line 18, and brought into play by the initial action of the relay, is de-energized by pushing the start button of master start-stop switch 29. The second energizing current is de-energized by known means with additional relays not shown in the drawing. Thus, the valve in drain line 75 leading to a steam trap is open during the warm-up and hot stand-by periods, but closed during normal operation of the apparatus.

If the desired starch slurry is not present in slurry tank 107, it is now prepared by starting agitator 108, preferably driven by electric motor, and charging the required quantities of starch and water into the tank. Positive displacement pump 12, also preferably powered by an electric motor, is started. It recirculates the starch slurry from bottom to top of the slurry tank through an outside pipe line containing relief valve 8 as shown in FIG. 1. At this stage, relief valve 8 is set for essentially 0 p.s.i. relief pressure because switch 29 in electric line 57 is open, thus keeping solenoid valve 51 closed and preventing air pressure from line 60 reaching the bonnet of relief valve 8.

The combination of positive displacement pump 12 with relief valves 7 and 8 both set for relief pressures substantially above the detention tank operating pressure is less expensive than a metering pump. Also, it allows for considerable wear in the pump before interruption of service.

Flow of starch slurry to mixing zone 31 and detention tank 11 begins when switch 29 is closed. This opens solenoid valve 51 in air line 60, since lower probe 56 in paste storage tank 54 is exposed, and supplies pressure regulating valve 50 with air at 100 p.s.i. As explained earlier, the output pressure of valve 50, delivered to the bonnet of relief valve 8 through air line 60, quickly and smoothly builds up to 65 p.s.i. The relief pressure of valve 8, now at 85 p.s.i., forces the slurry through pipe 9 and relief valve 7, set at 65 p.s.i. relief pressure by the 65 p.s.i. pilot air pressure in air line 77, and thus through mixing chamber 31 and into detention tank 11. Constriction 113 in pipe 9 is a length of small bore tubing which passes 4 g.p.m. of slurry with a 20 p.s.i. pressure drop at a head pressure of 85 p.s.i.

As the starch slurry flows into the mixing chamber and detention tank, where it is heated, pasted, and thermally modified, the lever of accumulated paste in the detention tank rises until the increasing hydrostatic pressure opens flow regulating valve 16. As explained earlier, this relief valve is highly responsive to the detention tank paste level through differential pressure cell 21 and pressure controller 25. It allows the paste to flow out the bottom of the tank at a rate which maintains a constant paste level in the detention tank.

Paste continues to flow out of the detention tank and into paste storage tank 54 until the flow is stopped soon after the upper probe 55 is immersed. As explained before, immersion of the upper probe in rising paste stops the slurry flow into the mixing chamber, drains the detention tank, blows out the paste line, and puts the apparatus on hot stand-by condition. The apparatus remains in this condition until started up again by using or draining paste from the storage tank and exposing the lower probe.

Attention is called to the control advantages obtained by setting the reduced air pressure of valve 6 at about 10 p.s.i. above the desired operating pressure of the detention tank, and using valve 6 output pressure for a multiplicity of purposes. Using it as a reference pressure for differential pressure cell 21 and pressure controllers 17 and 25, also as a pilot pressure for slurry relief valve 7, permits one to change the detention tank operating pressure and temperature over wide ranges merely by changing the setting of valve 6.

Obviously many variations in the apparatus of this invention are possible within the invention scope. For example, mixing chambers other than those based on the jet or aspirator principle are contemplated by the invention. All that is required of the mixing chamber is that it be enclosed and that the entering streams of material, condensable vapor and liquid composition be quickly, and uniformly, mixed together with a back pressure substantially the same as the detention tank pressure.

Size, shape and construction material of the detention tank can be varied widely without departing from the scope of the invention. Although a cylindrical detention tank is preferred, it is obvious that this shape is not essential.

Shape and positioning of the liquid distributing means, within the detention tank, are subject to wide variations within the scope of the invention. The means to supply the stream of liquid material to the mixing chamber, the means to sense the hydrostatic pressure of liquid accumulated in the detention tank and control the detention tank discharge valve, the type and construction feature of that discharge valve, the means to sense and control the detention tank steam pressure are all capable of wide variation within the scope of this invention.

Also, the invention is not limited by the kind, type, or design of the valves, relays, pressure controllers, and switches used in the foregoing described embodiment.

Having stated the objects of my invention, set forth its essential features, and described it broadly and narrowly, including a detailed description of a specific embodiment thereof, I claim:

1. Apparatus for the instantaneous heating of a flowing liquid with a hot condensable vapor and for holding the heated liquid at a selected temperature for a selected time comprising, in combination, a detention tank having a top feed port and a bottom discharge port, a mixing chamber having a hot vapor inlet, a liquid inlet and an outlet for a stream of mixed vapor and liquid, said outlet being closely connected to said feed port, said mixing chamber being adapted to mix the vapor turbulently with said liquid, a liquid distribution structure below said feed port arranged and adapted to receive the flow from said mixing chamber and to distribute it by gravity over the tank cross section, said tank also having a detention volume immediately above said discharge port for accumulating and detaining said stream in a pool of variable depth, means for delivering a continuous flow of said liquid at a selected rate through said mixing chamber to said feed port in opposition to the pressure at said feed port, means for maintaining a selected temperature and a selected pressure in said tank and means for maintaining a selected depth of said pool independently of said selected pressure.

2. Apparatus for the instantaneous heating of a flowing liquid with a hot condensable vapor and for holding the heated liquid at a selected temperature for a selected time comprising, in combination, a detention tank having a top feed port and a bottom discharge port, a mixing chamber having a hot vapor inlet, a liquid inlet and an outlet for a stream of mixed vapor and liquid, said outlet being closely connected to said feed port, said mixing chamber being adapted to mix the vapor turbulently with said liquid, a liquid distribution structure below said feed port arranged and adapted to receive the flow from said mixing chamber and to distribute it by gravity over the tank cross section, said tank also having a detention volume immediately above said discharge port for accumulating and detaining said stream in a pool of variable depth, means for delivering a continuous flow of said liquid at a selected rate through said mixing chamber to said feed port in opposition to the pressure at said feed port, means for maintaining a selected pressure of said vapor in said tank and thereby a selected temperature, a detector for the liquid level in said tank, means for maintaining constant the flow of liquid into said tank and means responsive to the liquid level detected for removing liquid from said tank to maintain a selected depth of said pool.

3. Apparatus for the instantaneous heating of a flowing liquid with a hot condensable vapor and for holding the heated liquid at a selected temperature for a selected time comprising, in combination, a detention tank having a top feed port and a bottom discharge port, a mixing chamber having a hot vapor inlet, a liquid inlet and an outlet for a stream of mixed vapor and liquid, said outlet being closely connected to said feed port, said mixing chamber being adapted to mix the vapor turbulently with said liquid, a liquid distribution structure below said feed port arranged and adapted to receive the flow from said mixing chamber and to distribute it by gravity over the tank cross section, said tank also having a detention volume immediately above said discharge port for accumulating and detaining said stream in a pool of variable depth, means for delivering a continuous flow of said liquid at a selected rate through said mixing chamber to said feed port in opposition to the pressure at said feed port, said delivering means including a pump, means associated with said pump for maintaining a selected rate of flow of said liquid to said mixing chamber independently of the pressure in said chamber, means for maintaining a selected pressure of said vapor in said tank and thereby a selected temperature, means for detecting the liquid level in said tank and control means operatively associated with said liquid level detecting means to regulate the rate of discharge of liquid from said tank to maintain a selected depth of said pool.

4. Apparatus for the instantaneous heating of a flowing liquid with a hot condensable vapor and for holding the heated liquid at a selected temperature for a selected time comprising, in combination, a detention tank having a top feed port and a bottom discharge port, a mixing chamber having a hot vapor inlet, a liquid inlet and an outlet for a stream of mixed vapor and liquid, said outlet being closely connected to said feed port, said mixing chamber being adapted to mix the vapor turbulently with said liquid, a liquid distribution structure below said feed port arranged and adapted to receive the flow from said mixing chamber and to distribute it by gravity over the tank cross section, said tank also having a detention volume immediately above said discharge port for accumulating and detaining said stream in a pool of variable depth, means for delivering a continuous flow of said liquid at a selected rate through said mixing chamber to said feed port in opposition to the pressure at said feed port, said delivering means including a pump, means associated with said pump to maintain a selected rate of flow of liquid into said mixing chamber independently of the pressure in said mixing chamber including a first valve, a by-pass for liquid between said pump and said chamber, a by-pass for liquid between said pump and said first valve and having a second valve and means for simultaneously adjusting the opening and closing of said first and second valves in opposite directions in response to changes in the rate of flow between said second, said bypass and said mixing chamber, the diversion of flow through said by-pass determining the rate of flow to said mixing chamber, means for maintaining a selected pressure of said vapor in said tank and thereby a selected temperature, means for detecting the liquid level in said tank and control means operatively associated with said liquid level detecting means to regulate the rate of discharge of said liquid from said tank to maintain a selected depth of said pool.

5. Apparatus for the instantaneous heating of a flowing liquid with a hot condensable vapor and for holding the heated liquid at a selected temperature for a selected time comprising, in combination, a detention tank having a top feed port and a bottom discharge port, a mixing chamber having a hot vapor inlet, a liquid inlet and an outlet for a stream of mixed vapor and liquid, said outlet being closely connected to said feed port, said mixing chamber being adapted to mix the vapor turbulently with said liquid, a liquid distribution structure below said feed port arranged and adapted to receive the flow from said mixing chamber and to distribute it by gravity over the tank cross section, said tank also having a detention volume immediately above said discharge port for accumulating and detaining said stream in a pool of variable depth, means for delivering a continuous flow of said liquid at a selected rate through said mixing chamber to said feed port in opposition to the pressure at said feed port, first pressure detection means for the pressure in the upper part of said tank, control means for the pressure of said vapor operatively connected to said pressure detection means to respond to the tank upper pressure to regulate the vapor pressure and thereby the temperature in said tank, control means operatively associated with said discharge port for regulating the discharge rate from said tank and connected also with said first pressure detection means, second pressure detection means operatively connected with the bottom of said tank and with said discharge control means, said discharge control means being responsive to the difference in pressures sensed by the first and second pressure detection means to maintain a selected depth of said pool.

6. Apparatus for the instantaneous heating of a flowing liquid with steam and for holding the heated liquid at a selected temperature for a selected time comprising, in combination, a detention tank having a top feed port and a bottom discharge port, a mixing chamber having a steam inlet, a liquid inlet and an outlet for a stream of mixed steam and liquid, said outlet being closely connected to said feed port, said mixing chamber being adapted to mix steam turbulently with said liquid, a liquid distribution structure in said tank below said feed port arranged and adapted to receive the flow from said mixing chamber and distribute it by gravity over the tank cross section, said tank also having a detention volume immediately above said discharge port for accumulating and detaining said stream in a pool of variable depth, means for delivering a continuous flow of said liquid at a selected rate through said mixing chamber to said feed port in opposition to the pressure at said feed port, means for distributing a non-condensable gas in said mixed stream to reduce the density of the mixed stream as it enters said detention volume, a vent on said tank above said detention volume for removing excess gas, first pressure detection means for the pressure in the upper part of said tank, control means for the pressure of said steam operatively connected to said pressure detection means to respond to the tank upper pressure to regulate the steam pressure and thereby the temperature in said tank, control means operatively associated with said discharge port for regulating the discharge rate from said tank and connected also with said first pressure detection means, second pressure detection means operatively connected with the bottom of said tank and with said discharge control means, said discharge control means being responsive to the difference in pressures sensed by the first and second pressure detection means to maintain a selected depth of said pool.

7. The apparatus of claim 4 which includes means for detecting the pressure of liquid at said first valve and means for regulating said second valve in response to the pressure detected.

8. In a continuous starch pasting apparatus wherein an aqueous slurry of starch is continuously mixed with steam in a steam jet and discharged into a chamber maintained at superatmospheric pressure, means for regulating the flow of slurry to the steam jet comprising a tank for holding a supply of starch slurry, a pump whose intake is connected to said tank, a feed conduit connecting the outlet of said pump with said jet, a first valve in said feed conduit, flow detector means in said feed conduit, a bypass conduit connecting said tank with said feed conduit upstream of said flow detector, a second valve in said bypass conduit and means for simultaneously opening said first valve and closing said second valve in response to the flow detector to proportion the flow of slurry between said feed and bypass conduits to maintain a constant flow of slurry through said feed conduit to said jet.

9. The apparatus of claim 8 wherein said flow detector comprises means to detect the pressure in said feed conduit downstream of the bypass conduit and wherein the flow of slurry is proportioned in response to detected pressure.

10. The apparatus of claim 8 including means to introduce a gas into said feed conduit on the downstream side of said first valve, means to detect the pressure of said gas in said feed conduit and means for regulating said second valve in response to the detected pressure, thereby to proportion the flow of slurry.

References Cited by the Examiner
UNITED STATES PATENTS

| | | | |
|---|---|---|---|
| 2,195,335 | 3/1940 | Loginov | 127—28 |
| 2,730,468 | 1/1956 | Martin | 127—28 |
| 2,940,876 | 6/1960 | Elsas | 127—28 |

MORRIS O. WOLK, *Primary Examiner.*